United States Patent
Anderson et al.

(10) Patent No.: US 12,275,522 B2
(45) Date of Patent: Apr. 15, 2025

(54) CLUTCH ACTUATOR ASSEMBLY

(71) Applicant: Borealis Technical Limited, North Plains, OR (US)

(72) Inventors: Robert W. Anderson, Witchita Falls, TX (US); Shawn Green, Alexandria, MN (US); Yonatan Rontenberg, Miami, FL (US); Shaun Salisbury, Oakville (CA)

(73) Assignee: WheelTug, plc, Isle of Man (IM)

( * ) Notice: Subject to any disclaimer, the term of this patent is extended or adjusted under 35 U.S.C. 154(b) by 0 days.

(21) Appl. No.: 18/365,310

(22) Filed: Aug. 4, 2023

(65) Prior Publication Data

US 2024/0043113 A1    Feb. 8, 2024

Related U.S. Application Data

(60) Provisional application No. 63/395,455, filed on Aug. 5, 2022.

(51) Int. Cl.
*F16D 27/14* (2006.01)
*B64C 25/32* (2006.01)

(52) U.S. Cl.
CPC ............ *B64C 25/405* (2013.01); *F16D 27/14* (2013.01)

(58) Field of Classification Search
CPC ....... B64C 25/405; F16D 27/14; F16D 41/10; F16D 41/16; F16D 41/08
See application file for complete search history.

(56) References Cited

U.S. PATENT DOCUMENTS

| | | | |
|---|---|---|---|
| 8,490,769 B2 | 7/2013 | Pritchard et al. | |
| 9,567,069 B2 | 2/2017 | Cox | |
| 9,909,631 B2 | 3/2018 | Essenmacher | |
| 10,308,352 B2 | 6/2019 | Cookman et al. | |
| 10,457,385 B2 * | 10/2019 | Essinger | B64C 25/405 |
| 11,098,770 B2 * | 8/2021 | Cioc | F16D 27/00 |
| 2014/0332622 A1 * | 11/2014 | Charles | B64C 25/405 |
| | | | 244/50 |
| 2015/0151833 A1 * | 6/2015 | Cox | H02K 9/223 |
| | | | 301/6.2 |
| 2015/0323019 A1 * | 11/2015 | Bedarrides | F16D 41/086 |
| | | | 244/50 |
| 2016/0298704 A1 * | 10/2016 | Itagaki | F16D 28/00 |

* cited by examiner

*Primary Examiner* — Stacey A Fluhart

(57) ABSTRACT

A powered clutch actuator assembly for integration with a clutch assembly is provided. The actuator and clutch assemblies, sized to fit within constraints of an aircraft landing gear wheel-mounted taxi drive system, are engineered to occupy a default neutral disengaged position that prevents torque transfer when torque to move the aircraft should not be transferred to the taxi drive system. Multiple solenoids and diodes power rotational motion of the actuator assembly to move a bi-directional clutch component in a desired rotational direction during torque transfer. A locking solenoid automatically locks and maintains the actuator assembly in a neutral disengaged condition when none of the solenoids are powered and disengages the actuator assembly when one solenoid is powered to cause rotation of the actuator assembly. Solenoid supports structured to operate as integral heat sinks may direct heat to an on-aircraft heat sink, prolonging the working life of the actuator assembly.

20 Claims, 6 Drawing Sheets

CLUTCH ACTUATOR ASSEMBLY

TECHNICAL FIELD

The present invention relates generally to actuator assemblies operable to actuate vehicle clutch assemblies and specifically to a clutch actuator assembly designed to actuate a clutch assembly in an aircraft landing gear wheel-mounted taxi drive system.

BACKGROUND OF THE INVENTION

Moving aircraft during ground operations with taxi drive systems has been proposed to minimize time aircraft spend on the ground during airport ground operations. Employing taxi drive systems instead of an aircraft's main engines and tow vehicles to move aircraft into and out of congested ramp areas enhances safety and reduces time aircraft spend on the ground. Applicant and others have proposed taxi drive systems operable to drive aircraft during ramp ground operations. Such taxi drive systems may incorporate an electric or other kind of clutch-actuated drive motor mounted completely within one or more aircraft nose or main landing gear wheels that transfers the torque required to drive the nose or main landing gear wheels and move the aircraft during ground operations. Advantageously, the taxi system may be selectively activated by a clutch to transfer this torque only as required to drive an aircraft landing gear wheel and move the aircraft during ground operations.

While vehicle clutch assemblies for automotive and similar vehicle applications are known, these clutch assemblies are not designed to be sufficiently robust to function effectively and reliably in an aircraft taxi drive system environment and to ensure selective actuation of an aircraft landing gear wheel-mounted drive motor. Such clutch assemblies may not be capable of selectively transferring torque to the drive motor in a landing gear wheel-mounted taxi drive system only when torque transfer is required. Available actuators for clutch assemblies may not provide a reliable failsafe capability that prevents actuation of the clutch assembly to transfer torque to the taxi drive system drive motor when operation of the taxi drive system to move the aircraft during ground operations would be unsafe or should not occur. Further, available actuators and clutch assemblies are not designed or sized to function effectively when mounted completely within the limited volume and space constraints of an aircraft landing gear wheel.

A need exists, therefore, for a clutch actuator designed and sized to be an integral component of a clutch assembly in an aircraft landing gear wheel-mounted taxi drive system that is mounted completely within the limited volume of space available in an aircraft landing gear wheel, that selectively actuates the clutch assembly to transfer torque to a drive motor, and that maintains the clutch assembly in a position that prevents torque transfer to the drive motor when operation of the taxi drive system is contraindicated.

SUMMARY OF THE INVENTION

It is a primary object of the present invention to provide a clutch actuator designed and sized to be an integral component of a clutch assembly in an aircraft landing gear wheel-mounted taxi drive system that is mounted completely within the limited volume of space available in an aircraft landing gear wheel, that selectively actuates the clutch assembly to transfer torque to a drive motor, and that maintains the clutch assembly in a position that prevents torque transfer to the drive motor when operation of the taxi drive system is contraindicated.

It is an additional object of the present invention to provide an aircraft landing gear wheel-mounted taxi drive system clutch assembly with an integral clutch actuator assembly that has smaller axial dimensions than available clutch assemblies and actuators and may be operationally mounted completely within a defined volume of space within the aircraft landing gear wheel.

It is another object of the present invention to provide an aircraft landing gear wheel-mounted taxi drive system clutch assembly with a clutch actuator assembly integrally positioned on a clutch assembly selector plate that is designed to rotate in two directions and is engineered to be biased to and maintained in a default neutral disengaged position when the clutch assembly should not be actuated.

It is a further object of the present invention to provide an aircraft landing gear wheel-mounted taxi drive system clutch actuator assembly integrated with a lockable clutch assembly selector plate that uses the operation of a combination of multiple solenoids and diodes to selectively power the clutch actuator assembly and cause it to actuate and lock the selector plate.

It is a further object of the present invention to provide a clutch actuator assembly powered by a combination of multiple diodes and solenoids with supports operable to mount the solenoids to a selector plate integral with a clutch assembly and to transfer heat from the solenoids to a heat sink.

It is yet a further object of the present invention to provide an aircraft landing gear wheel-mounted taxi drive system clutch actuator assembly with improved reliability, ease of control, and predictable operation during all phases of aircraft utilization.

In accordance with the aforesaid objects, the present invention provides a clutch actuator assembly integrated with a clutch assembly in an aircraft landing gear wheel-mounted taxi drive system. The clutch actuator assembly has a smaller axial dimension than available actuators, enabling the clutch assembly and the clutch actuator assembly to fit completely within a limited volume of lateral space defined by walls of the aircraft landing gear wheel where the taxi drive system is mounted. A height or axial dimension of the clutch assembly and clutch actuator assembly may be limited by a landing gear wheel hub cap or by locations and configurations of other wheel and landing gear structures associated with landing gear retraction. The clutch assembly and clutch actuator assembly dimensions should not limit or otherwise interfere with landing gear retraction.

The clutch actuator assembly has a mechanical linkage to the clutch assembly to drive a bi-directional selector plate in the clutch assembly. The clutch actuator assembly is engineered to change linear motion of solenoids powering the clutch actuator assembly directly to rotational motion of a bell crank shaft. Torque transfer by the clutch assembly is prevented when the clutch actuator assembly is biased to occupy a default neutral disengaged position that prevents movement of both the clutch actuator assembly and the clutch bi-directional selector plate. The bi-directional selector plate is maintained in the default neutral disengaged position until one solenoid in a combination of multiple solenoids on the clutch actuator assembly is powered to rotate the selector plate in a desired rotational direction. When none of the solenoids are powered, a locking solenoid automatically locks the clutch actuator assembly in a neutral disengaged condition. Solenoid supports are structured so these supports may operate as integral heat sinks that then may direct heat to an on-aircraft heat sink, prolonging the working life of the clutch actuator assembly.

Other objects and advantages will be apparent from the following description, claims, and drawings.

DESCRIPTION OF THE INVENTION

Figure 1A:
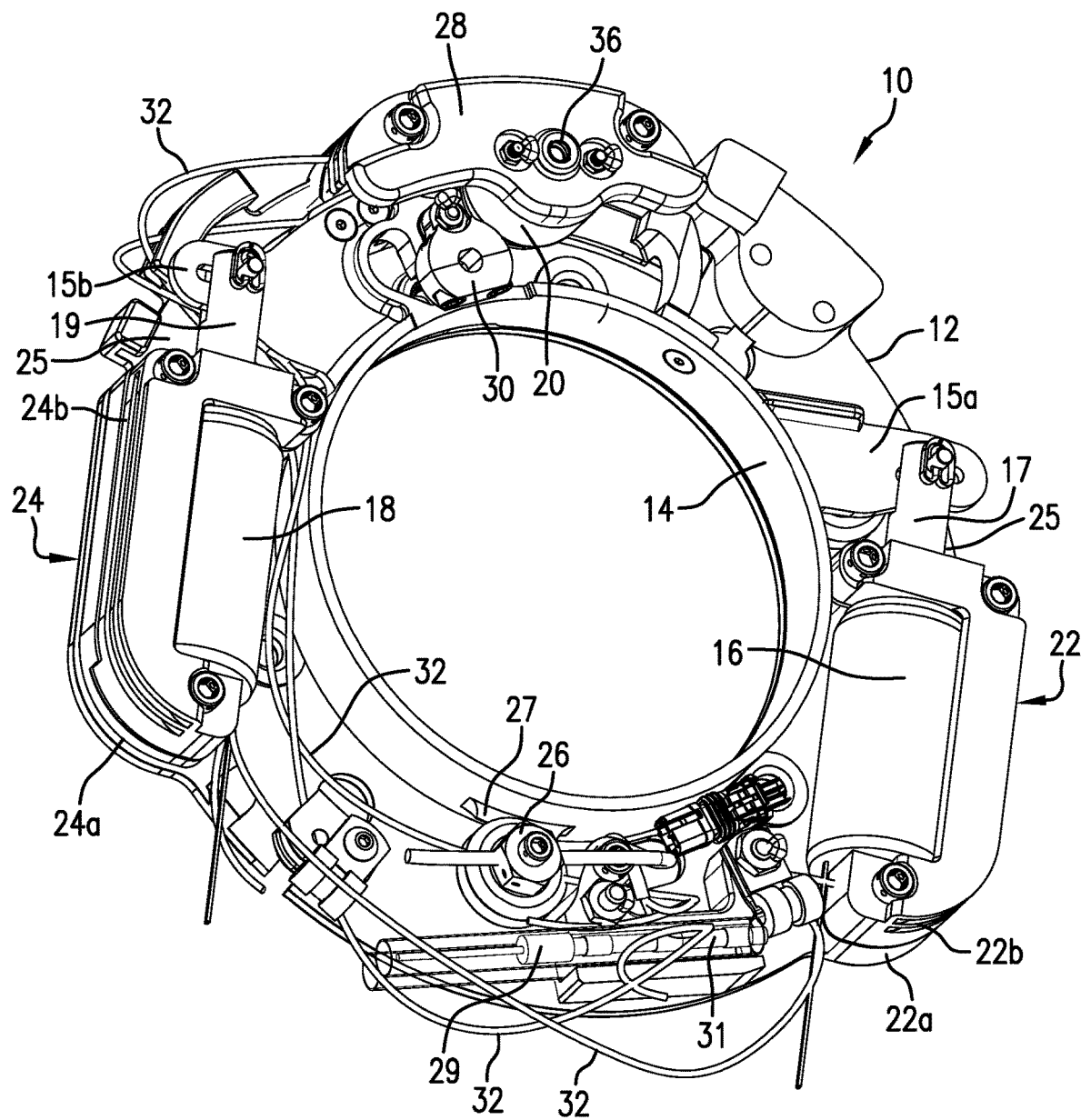
FIG. 1A is a top perspective view of a clutch actuator assembly according to the present invention.

Achieving the recognized benefits of being able to efficiently and safely move an aircraft during ground operations without reliance on operation of the aircraft's main engines or external tow vehicles has proved challenging. Applicant's proposed aircraft landing gear wheel-mounted taxi drive systems have been demonstrated to effectively power landing gear wheels and move aircraft on the ground, enabling aircraft operators and airports to realize the benefits of taxi drive system-powered aircraft ground movement. The present invention improves the capabilities of Applicant's proposed taxi drive systems and expands the possible advantages resulting from driving aircraft during ground operations with clutch-activated taxi drive systems. The present invention provides a clutch actuator assembly that is integrated with a clutch assembly in a drive system, preferably an aircraft landing gear wheel-mounted taxi drive system. The advantages of driving an aircraft with a drive motor in an aircraft landing gear wheel-mounted taxi drive system are achieved, in large part, by the design of the present clutch actuator assembly. The clutch actuator assembly is mechanically linked with the drive system clutch assembly and is selectively operable to transfer or not transfer torque and control operation of the taxi drive system to drive an aircraft landing gear wheel so that it causes the taxi drive system to move or not move an aircraft during ground operations.

"Taxi drive system" is used to refer to a pilot-controllable landing gear wheel-mounted drive system used to drive aircraft independently of and without reliance on operation of aircraft main engines and tugs or external tow vehicles. "Electric taxi drive systems" may include landing gear wheel-mounted electric drive motors, gear or roller traction drive systems, clutches, and other components activatable to power landing gear wheels and drive the aircraft during ground travel in response to pilot control. An example of one electric taxi drive system developed by Applicant to drive an aircraft during ground travel without reliance on operation of the aircraft's main engines or attachment to tugs is described in commonly owned U.S. Pat. No. 10,308,352, the disclosure of which is fully incorporated herein in its entirety by reference. Other drive motors that are not electric, including, for example, hydraulic or pneumatic drive motors, may also drive aircraft and are contemplated to be included within the terms "taxi drive systems." An electric or other taxi drive system is mounted completely within a volume of lateral space defined by walls of a landing gear wheel in one or more nose or main landing gear wheels. In a preferred embodiment, electric taxi drive systems are mounted completely within defined wheel wall volumes in both nose landing gear wheels and are controlled by a pilot or flight crew from the aircraft's cockpit with controls specifically designed to operate the electric taxi drive system, power the nose landing gear wheels, and drive the aircraft in a forward direction and in a reverse direction during ground travel without reliance on the aircraft's main engines and external assistance from tugs.

The terms "actuator" and "actuator assembly" are used interchangeably herein to refer to the clutch actuator assembly of the present invention.

Figure 1B:
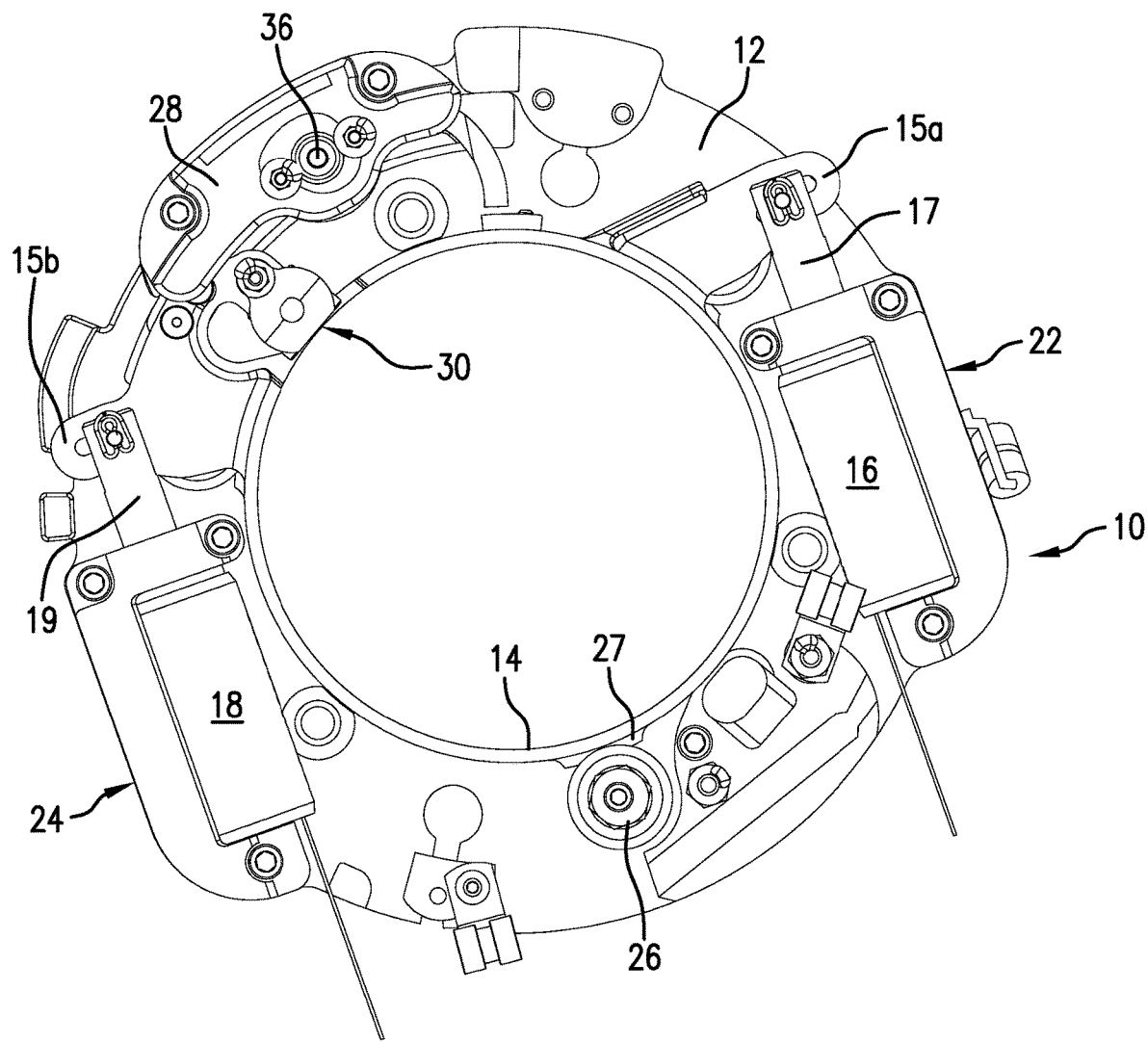
FIG. 1B is a top plan view of the clutch actuator assembly of FIG. 1A.

Referring to the drawings, which may not be drawn to scale, FIGS. 1A and 1B show, respectively, a top perspective view and a top plan view of a clutch actuator assembly 10 according to the present invention. The components of the clutch actuator assembly 10 may be attached to a mounting plate 12 and to a torque ring 14, which is secured to the mounting plate. The mounting plate 12 and torque ring 14, which may function as a bi-directional selector plate within the clutch assembly, include components that can move the actuator assembly in opposite rotational directions and that can disengage and lock the actuator assembly in a default neutral disengaged position. This is achieved by mounting multiple solenoids to enable the bi-directional rotation of the mounting plate and torque ring and the disengagement and locking functions. A combination of the multiple solenoids and diodes (29, 31) are provided to produce circuit paths for actuation without the need for a circuit board or electronics.

Figure 2:
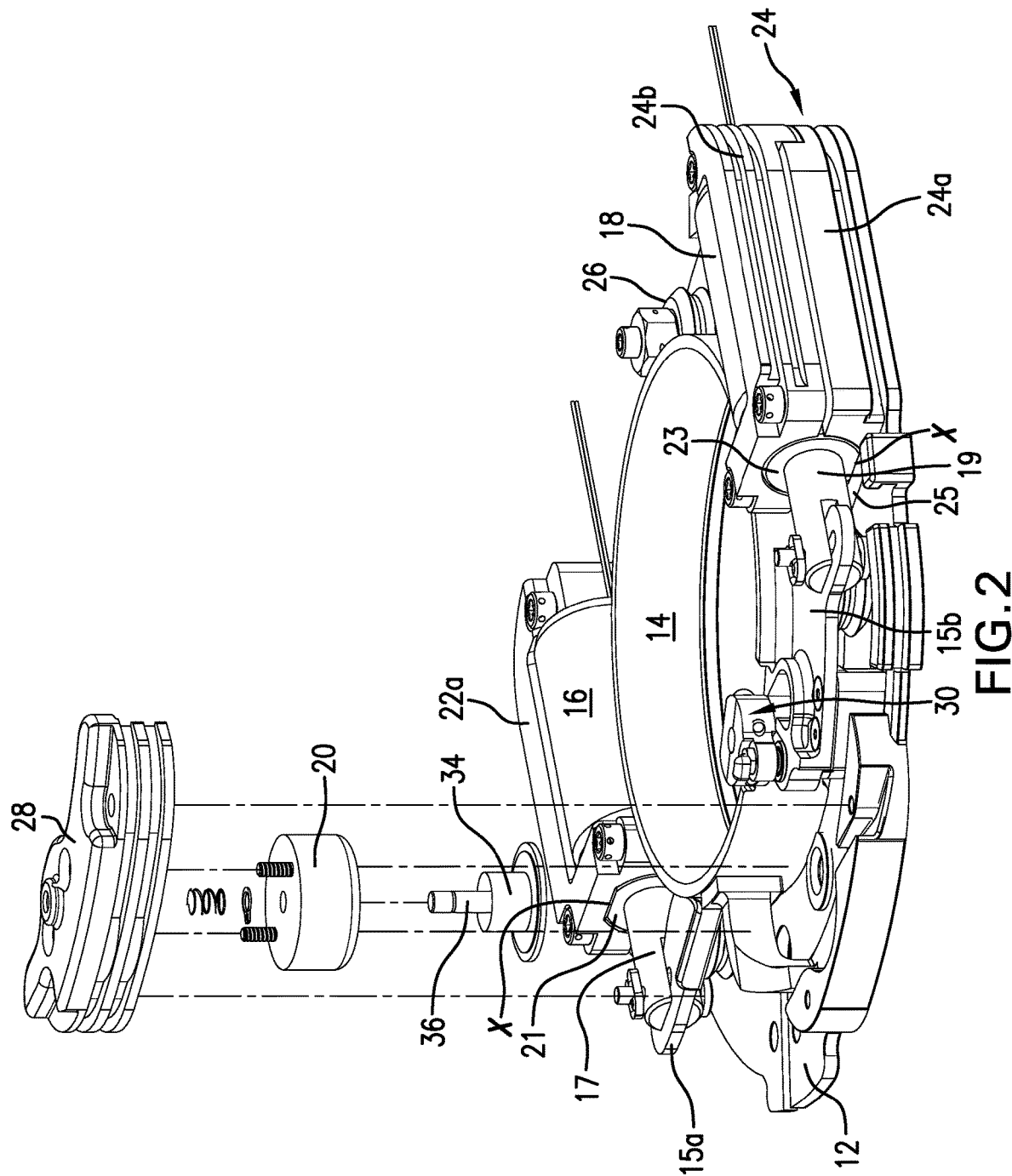
FIG. 2 is an exploded perspective view showing components of the locking solenoid assembly in the clutch actuator assembly of FIG. 1.

The clutch actuator assembly 10 shown in FIGS. 1A, 1B, and 2 advantageously employs three solenoids: two of the solenoids (16, 18) move the actuator assembly in opposite rotational directions, and the third solenoid (20) functions as a locking solenoid and locks the actuator assembly in the neutral disengaged position. The relative positions of the solenoids on the mounting plate 12 shown in FIGS. 1A and 1B have been found to function effectively. The solenoid positions may be adjusted or changed as required for different clutch applications. Solenoids 16 and 18 and their associated armatures 17 and 19 (FIG. 1B) are mounted with respective support brackets 22 and 24 that are secured to the mounting plate 12 and the torque ring 14. Advantageously, the solenoid support brackets 22 and 24 are the two-part structures as shown. Lower bracket sections (22a, 24a) are attached at opposed locations on the mounting plate 12 that are configured to accommodate the support brackets. The lower bracket sections (22a, 24a) in contact with the mounting plate 12 may be configured as required to receive the preferably cylindrical solenoids (16,18).

An anti-rotation flat element 21 may be mounted adjacent to an end of its support bracket (22, 24) between solenoid 16 and its armature 17, and an anti-rotation flat element 23 may be mounted between solenoid 18 and its armature 19. (FIG. 2) The anti-rotation flat elements 21 and 23 advantageously have a generally toroidal configuration with a circumferential straight edge, or flat portion, x as shown in FIG. 2. A flat surface, such as surface 25 adjacent to the lower bracket section 24a supporting the solenoid 18, may be provided adjacent to each solenoid 16 and 18 to align with the anti-rotation flat elements 21 and 23 as discussed below. The flat surface 25 may be part of the mounting plate 12 or a separate structure supported on the mounting plate 12. As shown in FIG. 2, the circumferential straight edge or flat x on the anti-rotation flat element 21 adjacent to solenoid 16 may be positioned to face away the flat surface 25 adjacent to lower bracket section 22*a*. Lower bracket section 22*a* and flat surface 25 for solenoid 16 are more clearly shown in FIGS. 1A and 1B. The straight edge or flat x on the anti-rotation flat element 23 adjacent to solenoid 18 may be positioned to face toward and contact the flat surface 25 adjacent to lower bracket section 24*a*. The positions of the straight edges or flats x on the anti-rotation flat elements 21 and 23 ensure that the respective solenoids 16 and 18 are keyed to the correct rotating direction when power is applied. Upper bracket sections 22*b* and 24*b* are attached to the respective lower bracket sections 22*a* and 24*b* and form the composite support brackets 22 and 24 that attach the solenoids to the mounting plate 12. A track roller 26 or like structure may be mounted on the mounting plate 12 to engage a track roller engagement element 27 on an outer surface of the torque ring element 14.

The third neutral or locking solenoid 20 may be sized and configured differently from the solenoids 16 and 18 and may be attached to a location on the mounting plate between the solenoids 16 and 18, as shown. The locking solenoid 20 may be positioned on an armature 34 (FIG. 2) on the mounting plate 12 and attached in place on the mounting plate with a mounting bracket 28 that is configured to cover the locking solenoid 20 and armature and has a configuration different from that of the mounting brackets 22 and 24 for the solenoids 16 and 18. The locking solenoid 20 may lock the actuator assembly 10 in the neutral disengaged position with a pin 36 (FIG. 2) that may be part of the solenoid armature. Power is not required to lock the locking solenoid 20. A rotatable bell crank assembly 30 connected to a crank arm 33 (FIG. 4) may be attached to the torque ring element 14 interiorly adjacent to the locking solenoid 20.

The mounting brackets 22, 24, and 28 for the three solenoids 16, 18, and 20 may be made of a heat transfer material that enables the mounting brackets to function as heat sinks during operation of the clutch actuator assembly. Current flowing through the operating actuator assembly generates heat. Providing this heat dissipating structure immediately adjacent to the solenoids prolongs the life of the solenoids 16, 18, 20 and the duty cycle of the actuator assembly 10. Heat may then be directed away from the clutch actuator assembly and clutch assembly to a larger heat sink structure, for example an aircraft wheel or the like, when the clutch actuator assembly is mounted within an aircraft wheel. Mounting brackets 22, 24, 28 may be made of a material that works well as a heat sink, for example aluminum. It is contemplated that other materials that work well as heat sinks and that satisfy weight, machinability, cost, and balance requirements for the specific clutch actuator assembly may also be used.

An electrical system with a wire harness (not shown) may be provided that includes an arrangement of wires 32 positioned within grooves or otherwise connected to the mounting plate 12 to create circuit paths. The wires 32 direct electric current to the solenoids 16, 18, and 20 and to other powered elements of the clutch actuator assembly 10. A pair of diodes 29 and 31, in combination with circuit paths in the electrical system, produces actuation of the actuator assembly 10. The diodes, which are preferably Schottky diodes, prevent flyback current from going back through the system to a controller (not shown) and causing damage to the system. While the arrangement of three solenoids and two diodes described and shown herein may be preferred, it is contemplated that other numbers and arrangements of powered and locking solenoids and diodes may be employed within the scope of the present invention. Other configurations and numbers of solenoids and diodes could be used in other applications requiring a different sequence of events than that described herein or different control logic.

FIG. 1B, which, as noted, presents a top plan view of the clutch actuator assembly 10 of FIG. 1A, illustrates more clearly the attachment of armatures for the solenoids 16 and 18 to attachment ears 15*a* and 15*b*. The attachment ears 15*a* and 15*b* may be formed integrally with the torque ring 14 or may be attached to the torque ring 14. Attachment ear 15*a* secures only the armature 17 for solenoid 16 to the torque ring 14, while attachment ear 15*b* secures the armature 19 for solenoid 18 to the torque ring and also attaches the bell crank assembly 30 to the torque ring. The attachment ears 15*a* and 15*b* may have different configurations that achieve these functions.

FIG. 2 is an exploded perspective view of one possible arrangement of components that function to mount the locking solenoid 20 to the mounting plate 12 in the clutch actuator assembly 10. An armature 34 with a projecting pin 36 engages the locking solenoid 20 and supports the locking solenoid on the mounting plate 12. The solenoid mounting bracket 28 secures these components to the mounting plate 12. As noted above, the anti-rotation flat elements 21 and 23 and the orientations of their straight edges or flats x with respect to flat surfaces 25 are clearly shown in FIG. 2. A perspective position of the rotatable bell crank assembly 30 relative to the other components of the clutch actuator assembly is also shown in FIG. 2.

Figure 3:
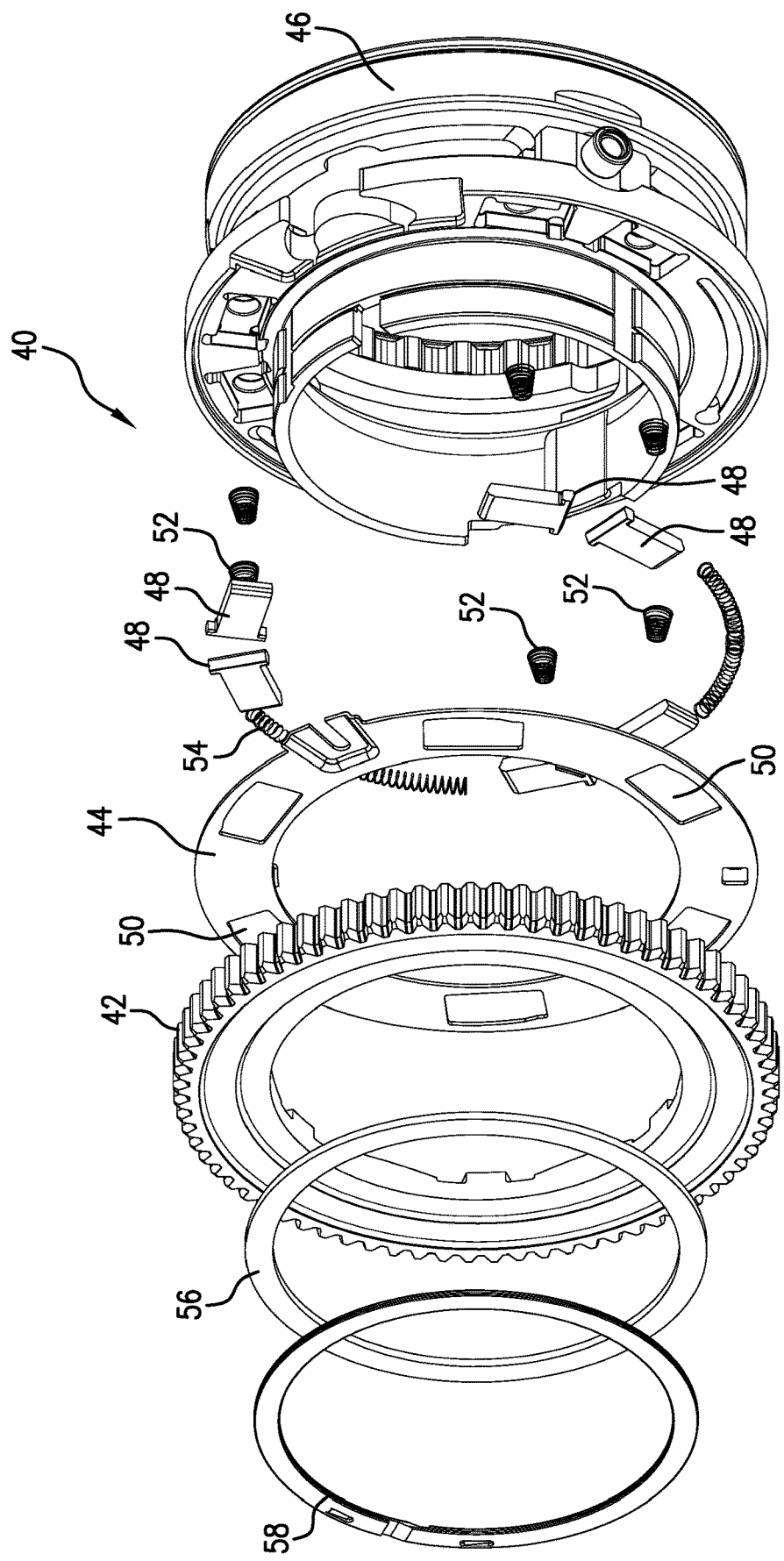
FIG. 3 is an exploded perspective axial view of the components of a type of clutch assembly that may be actuated by a clutch actuator assembly according to the present invention.
Figure 4:
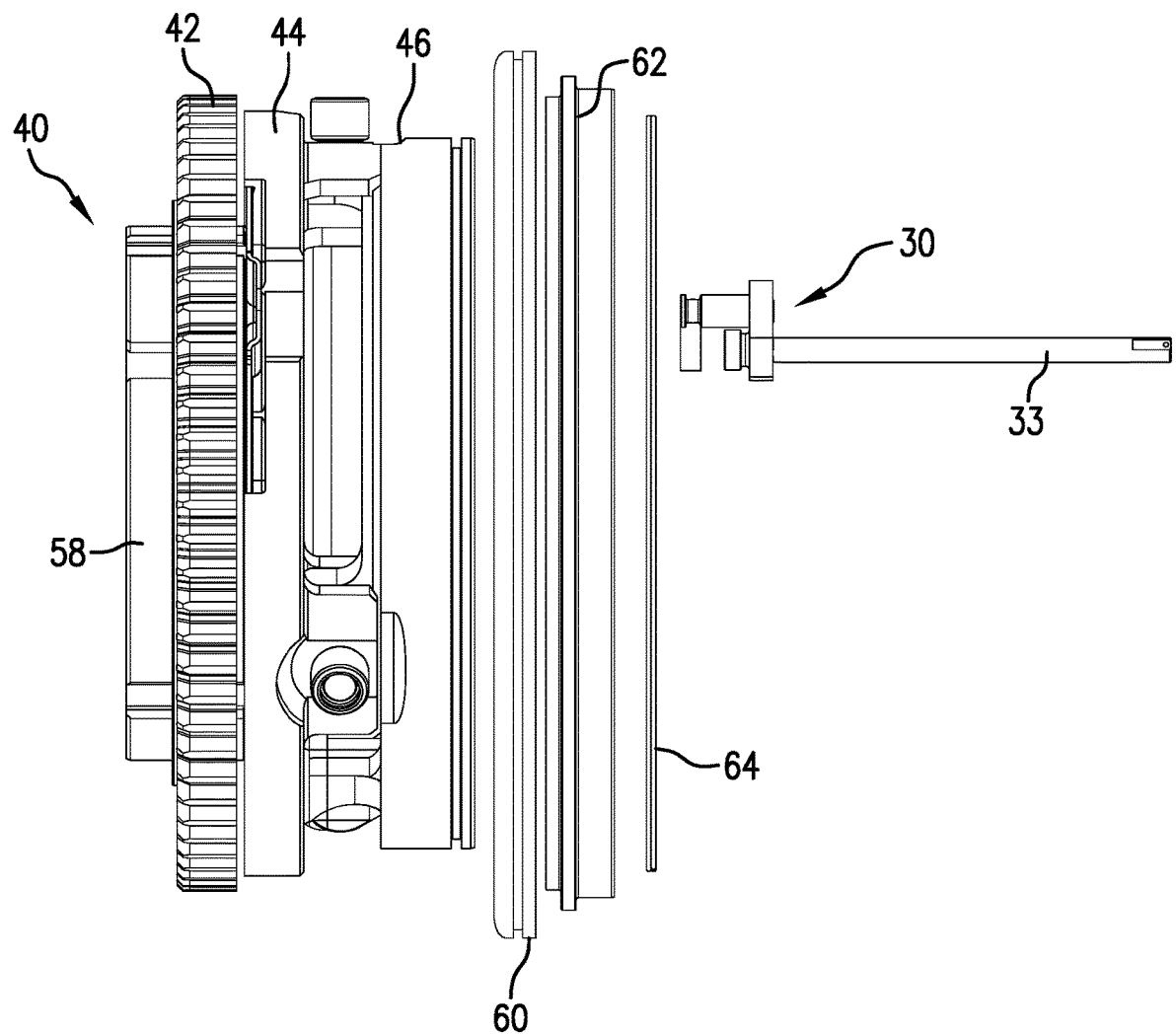
FIG. 4 shows a close-up view of an upper axial portion of the clutch assembly shown in FIG. 3 with the components assembled.

FIGS. 3 and 4 illustrate, respectively, an exploded perspective axial view of the individual components and a view of an upper axial portion of the assembled components of a type of clutch assembly 40 that may be actuated by a clutch actuator assembly according to the present invention. Types of clutch assemblies that may be actuated by the clutch actuator assembly of the present invention typically include multiple components, as shown in FIGS. 3 and 4. The clutch assembly 40 shown in the drawings is meant to be illustrative, and other clutch assemblies that may be adapted to function with the actuator assembly shown and described herein are also within the scope of the present invention. The clutch assembly 40 components are arranged axially to be rotatably mounted on a shaft, such as an aircraft landing gear axle, and may include a notch plate 42, a bi-directional selector plate 44, and a pocket plate 46. A number of spring-biased struts 48 spaced circumferentially about the pocket plate 46 move between the pocket plate and openings 50 in the bi-directional selector plate to prevent or allow rotation in a desired clockwise or counterclockwise direction and transmit torque through the clutch. Compression springs 54 may act in combination with the clutch actuator assembly to bias the bi-directional selector plate 44 into a neutral disengaged position, as described herein. Additional components, such as springs 52 to bias the struts 48, a thrust washer 56, a retaining ring 58, and the like, may be included in the clutch assembly 40.

FIG. 4 shows the assembled clutch assembly 40, which includes the notch plate 42, the bi-directional selector plate 44, and the pocket plate 46 arranged axially; the struts and springs are not shown. A circumferential spring 60, a bearing 62, and a retaining ring 64 may be provided between the pocket plate 46 and the adjacent bell crank assembly 30. The clutch actuator assembly 10 has a mechanical linkage through the crank arm 33 and the rotatable bell crank assembly 30 to the clutch assembly 40.

Figure 5:
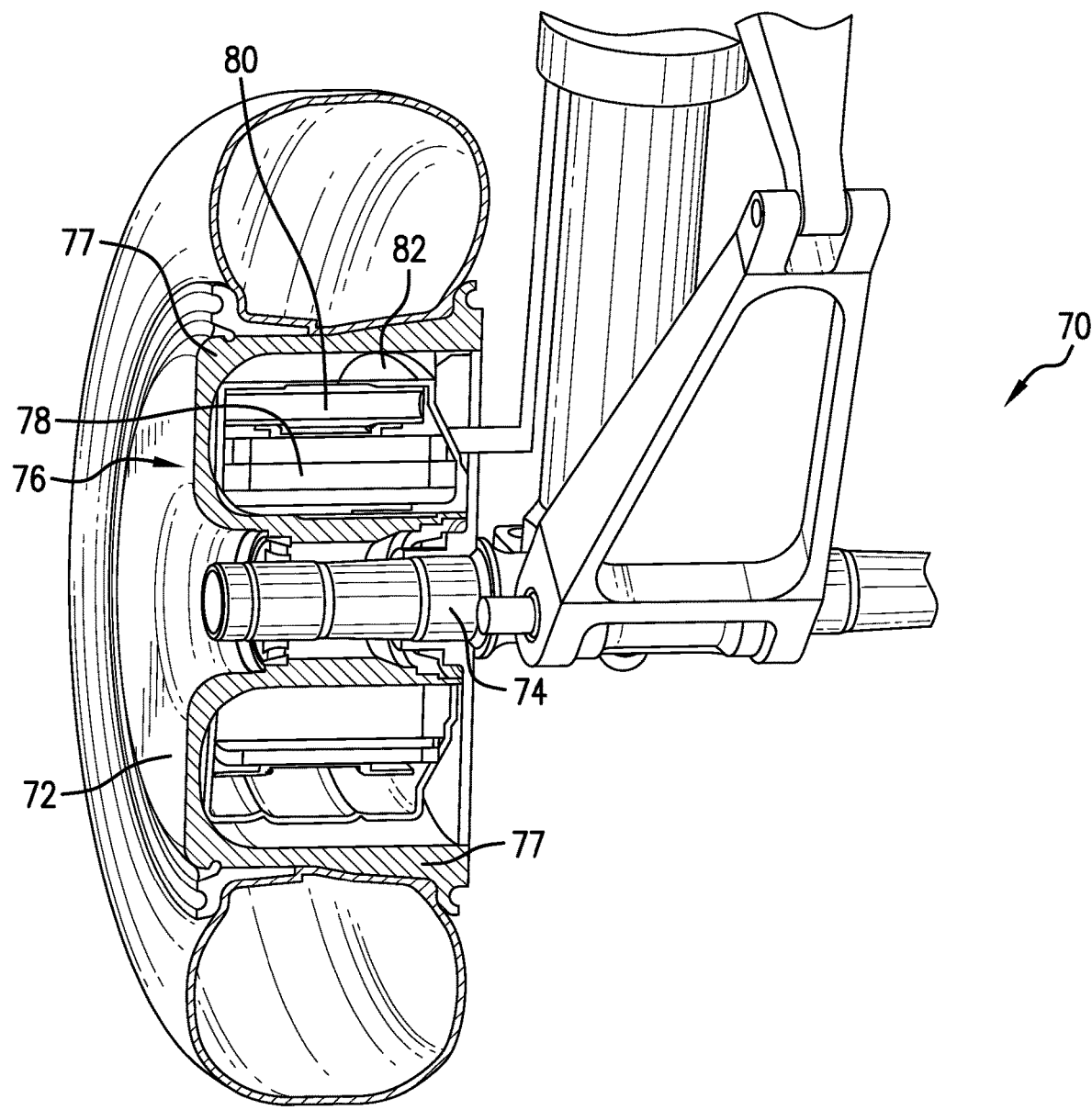
FIG. 5 is a cross-sectional perspective schematic view of a portion of an aircraft landing gear wheel-mounted taxi drive system showing a location for the clutch and clutch actuator assembly of the present invention fitted completely within the landing gear wheel.

FIG. 5 shows, in cross-sectional perspective view, a portion of an aircraft landing gear 70 with a landing gear wheel 72 mounted on an axle 74 and a taxi drive system 76 mounted completely within a volume of space formed by walls 77 (shown in cross-section) of the landing gear wheel 72. Components of the taxi drive system 76 are represented schematically in FIG. 5. Taxi drive system components may include a drive motor 78 and a gear assembly or equivalent drive system 80. A clutch assembly 82, shown schematically in FIG. 5 and described in detail above, is also mounted completely within the landing gear wheel walls to transfer torque through the taxi drive system. The clutch actuator assembly 10, shown in FIGS. 1A and 1B and described in detail above, is integrated with the clutch assembly 82 in the taxi drive system. Although only one landing gear wheel is shown in detail, it is contemplated that one or more nose landing gear wheels, one or more main landing gear wheels, or a combination of nose and main landing gear wheels could be equipped with clutch actuator assemblies to actuate clutch assemblies in taxi drive systems as described herein.

One benefit of the clutch actuator assembly 10 of the present invention is its small axial thickness dimension compared to alternative clutch actuators. The clutch actuator assembly of the present invention may have an axial thickness as small as about one inch, for example. When combined with a clutch assembly and associated operational components, the total axial thickness of the clutch assembly, operational components, and the clutch actuator assembly will be significantly less than available clutch and actuator assemblies. A clutch assembly and a clutch actuator assembly according to the present invention will fit in smaller axial spaces, including the limited axial space in aircraft landing gear wheels, than available clutch and actuator assemblies.

In operation, the clutch actuator assembly of the present invention acts directly to change the linear motion of the solenoids to rotational motion of a shaft or crank arm 31 connected to the bell crank assembly 30 and applies this force onto the bi-directional clutch selector plate 44. This force is counteracted by springs internal to the clutch assembly, such as springs 54 (FIG. 3). The springs 54 apply the return force required to move the bi-directional selector plate 44 and the clutch actuator assembly 10 back to a neutral disengaged state so that the locking solenoid 20 can lock the clutch in the neutral disengaged state.

The solenoids 16 and 18 may be selectively powered to rotate the mounting plate 12 in opposite rotational directions, and the locking solenoid 20 enables the clutch actuator assembly to lock the clutch bi-directional selector plate 44 in the neutral disengaged position. The clutch actuator assembly can only lock the clutch selector plate 44 in the neutral disengaged position; it cannot lock the clutch selector plate in either rotational extremum. Solenoids 16 and 18 will never be powered at the same time, which is ensured by the diodes 29 and 31. When solenoid 16, for example, is powered to rotate the selector plate 44 in a clockwise direction, stopping power flow to solenoid 16 will cause the springs 54 to rotate the selector plate 44 and return it to the neutral disengaged position. The selector plate 44 will remain in the neutral disengaged position until solenoid 18 is powered to rotate the selector plate 44 in an opposite counterclockwise direction or until solenoid 16 is again powered to rotate the selector plate 44 in the clockwise direction. When there is no power flowing through the clutch actuator assembly, the pin 36 on the locking solenoid 20 is extended, and the return springs in the clutch assembly cause the assembly to rotate so that the pin 36 can engage a retaining hole (not shown). The springs in the clutch apply force through the shaft or crank arm 33 to the bell crank assembly 30 to move the locking pin 36 into a locking position.

The foregoing arrangement takes advantage of basic electrical principles by using a lock solenoid 20 with a smaller coil and prime mover solenoids 16, 18 with larger coils. The diodes 29 and 31 act as a gate mechanism to direct electric power to one prime mover solenoid based on the polarity of the incoming power. At the same time, power is supplied to the lock solenoid. The smaller coils of the lock solenoid electrically saturate faster than the large coils of the prime mover solenoids. This enables the lock solenoid to retract slightly ahead of the movement of the prime mover solenoids. To shift the clutch actuator assembly in the opposite direction, control electronics (not shown) first remove power, then reverse the polarity and re-apply power, causing the clutch actuator assembly to unlock and move in the opposite rotational direction.

When it is not powered, the clutch actuator assembly 10 is biased in a neutral disengaged position, and the neutral disengaged position is maintained to prevent torque transfer through the clutch assembly. A clutch actuator assembly 10 according to the present invention installed to actuate a clutch in an aircraft landing gear wheel-mounted wheel taxi drive system may direct torque transfer through the taxi drive system to move the aircraft. The clutch actuator assembly may also control driving direction of the taxi drive system-driven aircraft and, additionally, may prevent torque transfer when the neutral disengaged state is maintained. The clutch actuator assembly 10 described herein may be sized differently for different aircraft to operate within the space constraints of different aircraft landing gear wheels and with different clutch assemblies.

A major benefit of the clutch actuator assembly of the present invention is the predictable operation of the system to assume a neutral disengaged condition when it is powered off. Additional benefits include improved reliability and ease of control compared to available clutch actuators and extended operational and duty life of the clutch actuator assembly, the clutch being actuated, and the system in which it is installed.

While the present invention has been described with respect to preferred structures, arrangements and embodiments, this is not intended to be limiting, and other equivalent arrangements and structures that perform the required functions are contemplated to be within the scope of the present invention.

Industrial Applicability

The clutch actuator assembly for a clutch assembly of the present invention will find its primary applicability in an aircraft landing gear wheel-mounted taxi drive system and also in other drive systems where it is desired to realize the benefits of actuating and operating a drive system clutch assembly with improved reliability and ease of control, predictable operation when the system is turned off, and extended duty life for the clutch assembly and the drive system in which the clutch actuator assembly and clutch assembly are incorporated.

The invention claimed is:

1. A clutch actuator assembly operably integrated with a clutch assembly in a drive system, comprising:

a. a rotatable actuator assembly mounting element activatable to rotate in a selected rotational direction and lockable to prevent rotation in torque transfer connection with a clutch assembly;
b. multiple solenoids and power supply and control elements supported on said rotatable actuator assembly mounting element, said multiple solenoids comprising at least a pair of prime mover solenoids and a locking solenoid;
c. each one of said pair of prime mover solenoids being selectively activatable by said power supply and control elements to cause said rotatable actuator assembly mounting element to rotate in a selected rotational direction and in a selected opposite rotational direction and transfer torque through a mechanical linkage to said clutch assembly; and
d. said locking solenoid comprising a locking element engaging said rotatable actuator assembly mounting element to lock said rotatable actuator assembly mounting element in a default neutral disengaged position and prevent torque transfer through said mechanical linkage to said clutch assembly when said prime mover solenoids are not activated.

2. The clutch actuator assembly of claim 1, further comprising a bi-directional clutch assembly selector plate in torque transfer connection with said rotatable actuator assembly mounting element through said mechanical linkage.

3. The clutch actuator assembly of claim 2, wherein one of said pair of prime mover solenoids is selectively activatable to rotate said rotatable actuator assembly mounting element in a clockwise rotational direction and another one of said pair of prime mover solenoids is selectively activatable to rotate said rotatable actuator assembly mounting element in a counterclockwise direction.

4. The clutch actuator assembly of claim 3, wherein said rotatable actuator assembly mounting element comprises a substantially toroidal support plate and a torque ring positioned to connect to an inner circumference of said toroidal support plate, said torque ring comprising integrally formed attachment elements configured to attach armatures for each of said multiple solenoids.

5. The clutch actuator assembly of claim 4, further comprising solenoid support brackets for at least each of said prime mover solenoids, said solenoid support brackets comprising a lower bracket element on said support plate and an upper bracket element, said lower bracket element and said upper bracket element being configured to enclose a portion of each said prime mover solenoid and to secure each said prime mover solenoid to said support plate.

6. The clutch actuator assembly of claim 5, further comprising anti-rotation elements rotatably positioned adjacent to a bracket end on each of said prime mover solenoid support brackets facing an armature connected to each prime mover solenoid, each said anti-rotation element having a substantially toroidal configuration with a circumferential straight edge portion rotatable into and out of contact with an adjacent flat surface on said rotatable actuator assembly mounting element.

7. The clutch actuator assembly of claim 5, wherein said solenoid support brackets are formed of a heat transfer material.

8. The clutch actuator assembly of claim 6, further comprising a locking solenoid mounting bracket supported on said rotatable actuator assembly mounting element to position said locking solenoid in a circumferential location between each one of said pair of prime mover solenoids, said locking element being movable to engage locking structure on said rotatable actuator assembly mounting element to lock said rotatable actuator assembly mounting element in said neutral disengaged position when said prime mover solenoids are not activated or to disengage said locking structure to enable rotational movement of said rotatable actuator assembly mounting element when said prime mover solenoids are activated.

9. The clutch actuator assembly of claim 8, wherein said locking solenoid is in actuating and torque transfer connection through said mechanical linkage with a rotating bi-directional plate in said clutch assembly, said mechanical linkage comprising a bell crank assembly.

10. The clutch actuator assembly of claim 1, wherein said power supply and control elements comprise at least wires, diodes and circuit paths connected to a supply of electric power.

11. The clutch actuator assembly of claim 1, wherein said drive system comprises an aircraft landing gear wheel-mounted taxi drive system.

12. The clutch actuator assembly of claim 11, wherein said aircraft landing gear wheel-mounted taxi drive system comprises an electric taxi drive system mounted completely within wheel walls of each nose landing gear wheel on said aircraft.

13. A method for controlling torque transfer between a clutch actuator assembly and a drive system clutch assembly, comprising:
   a. providing a clutch actuator assembly in torque transfer connection through a mechanical linkage to a clutch assembly, the clutch actuator assembly comprising a rotatable mounting plate activatable to rotate in a selected rotational direction and lockable to prevent rotation;
   b. providing multiple solenoids mounted within sectioned brackets on the rotatable mounting plate, the multiple solenoids comprising a pair of prime mover solenoids supported and powered to cause the rotatable mounting plate to rotate in a selected rotational direction to transfer torque through the mechanical linkage to the drive system clutch assembly and a locking solenoid configured to lock the rotatable mounting plate in a neutral disengaged position and prevent torque transfer through the mechanical linkage to the drive system clutch assembly;
   c. directing power to one of the pair of prime mover solenoids, rotating the rotatable mounting plate in a desired rotational direction, transferring torque through the mechanical linkage to the drive system clutch assembly, and stopping power to the one prime mover solenoid;
   d. directing power to the other prime mover solenoid, rotating the rotatable mounting plate in an opposite desired rotational direction, transferring torque through the mechanical linkage to the drive system clutch assembly, and stopping power to the other prime mover solenoid; and
   e. in the absence of power directed to the one or the other prime mover solenoid, locking the rotatable mounting plate in a neutral disengaged position with the locking solenoid and preventing torque transfer through the mechanical linkage to the drive system clutch.

14. The method of claim 13, further comprising providing the sectioned mounting brackets for each of the prime mover solenoids with a bracket end adjacent to an anti-rotation flat element facing an armature for each prime mover solenoid, each anti-rotation flat element having a substantially toroidal configuration with a circumferential straight edge portion rotatable into and out of contact with an adjacent flat surface on the rotatable mounting plate, directing power to the one prime mover solenoid or to the other prime mover solenoid and causing the rotatable mounting plate to rotate in a desired clockwise or opposite counterclockwise rotational direction corresponding to the positions of the straight edge portions of the anti-rotation flat elements into or out of contact with the adjacent flat surfaces.

15. The method of claim 14, further comprising depowering the one or the other prime mover solenoid and stopping rotation of the rotatable mounting plate, activating the locking solenoid, and locking the rotatable mounting plate in the neutral disengaged position.

16. The method of claim 13, wherein the mechanical linkage comprises a bell crank assembly positioned between the clutch actuator assembly and the drive system clutch assembly, powering the one or the other of the prime mover solenoids, transferring torque to a bi-directional selector plate in the clutch assembly through the bell crank assembly, and rotating the rotatable mounting plate in a desired rotational direction, and whenever power to the prime mover solenoids is stopped, engaging the rotatable mounting plate in the neutral disengaged position with the locking solenoid and preventing torque transfer to the bi-directional selector plate.

17. The method of claim 13, wherein the drive system comprises a taxi drive system mounted completely within an aircraft landing gear wheel, the drive system clutch assembly transfers torque to the taxi drive system to rotate the aircraft landing gear wheel, and the clutch actuator assembly transfers torque to the clutch assembly when the prime mover solenoids are powered and causes the locking solenoid to lock the clutch actuator assembly in the neutral disengaged position, preventing transfer of torque to the clutch assembly through the mechanical linkage assembly, when prime mover solenoids are not powered.

18. The method of claim 13, further comprising providing a locking solenoid having a smaller coil than the prime mover solenoids and providing diodes operable to direct power having a first polarity to a prime mover solenoid, simultaneously supplying power to the locking solenoid and power with the first polarity to a prime mover solenoid, causing the locking solenoid assembly to retract, and rotating the clutch actuator assembly in the desired rotational direction.

19. The method of claim 18, further comprising changing the rotational direction of the clutch actuator assembly to an opposite rotational direction, removing power, reversing the first polarity, re-applying power to a prime mover solenoid, and causing the clutch actuator assembly to unlock and move in an opposite rotational direction.

20. The method of claim 19, wherein the desired rotational direction comprises a clockwise rotational direction and the opposite rotational direction comprises a counter clockwise counterclockwise direction.

* * * * *